Figure 4:
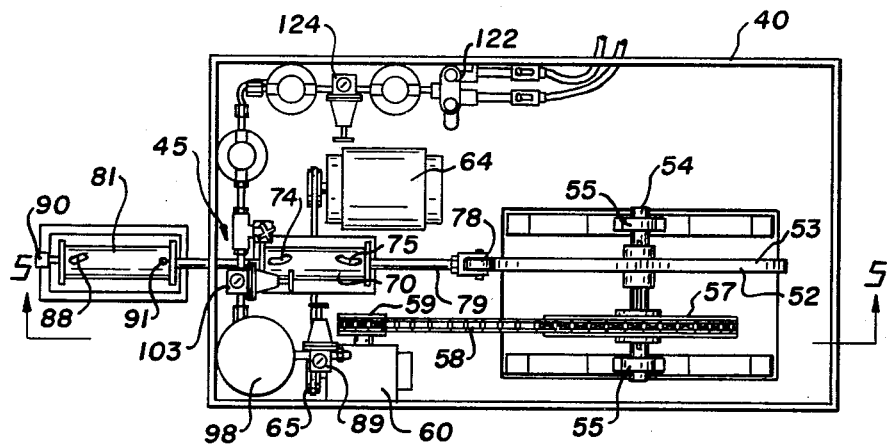

United States Patent [19]

Marshall et al.

[11] 4,046,180
[45] Sept. 6, 1977

[54] AUTOMATIC CONTROL APPARATUS FOR WANEY EDGE FORMING MACHINES

[75] Inventors: Henry James Marshall, Vancouver; Stuart Walter Windblad; William Wagner, both of Surrey, all of Canada

[73] Assignee: Island Lumber Specialties Ltd., Richmond, Canada

[21] Appl. No.: 696,185

[22] Filed: June 15, 1976

[51] Int. Cl.² .............................................. B27C 5/00
[52] U.S. Cl. ..................... 144/117 B; 83/368; 83/565; 90/11 R; 90/DIG. 13; 91/37; 144/2 R; 144/130; 144/134 R; 144/137; 144/142; 144/323

[58] Field of Search ................. 83/368, 565; 90/11 R, 90/11 C, 13 R, 15 A, DIG. 13; 91/37, 39; 144/2 R, 114 R, 117 A, 117 B, 134 R, 137, 142, 309 R, 323, 130

[56] References Cited

U.S. PATENT DOCUMENTS

| | | | |
|---|---|---|---|
| 2,830,629 | 4/1958 | Deiters | 144/117 B |
| 2,851,070 | 9/1958 | Hughes | 144/117 B |
| 3,044,508 | 7/1962 | Sherman | 144/2 R |
| 3,120,861 | 2/1964 | Finlay et al. | 144/2 R |
| 3,398,620 | 8/1968 | Gautron | 83/565 X |
| 3,616,826 | 11/1971 | Murphey et al. | 144/114 R |
| 3,779,294 | 12/1973 | Gillis | 144/117 B |

Primary Examiner—Othell M. Simpson
Assistant Examiner—W. D. Bray
Attorney, Agent, or Firm—Fetherstonhaugh and Company

[57] ABSTRACT

Control apparatus including first and second hydraulic cylinders hydraulically interconnected in parallel. Cam operated means for reciprocating the piston in the first cylinder, this causing relative movement between the second cylinder and the piston thereof. The second cylinder is connected to a cutter unit of a wood edging machine so that movement of the second cylinder moves the cutter unit. Pneumatic control means is connected to the piston of the second hydraulic cylinder and is operable to cause movement of the second cylinder unaffected by the piston therein. Detecting means is operatively connected to the pneumatic control means. This detecting means is positioned to detect knots in the edges of boards moving in the direction of the cutter unit to cause movement of said unit to avoid the knots.

18 Claims, 6 Drawing Figures

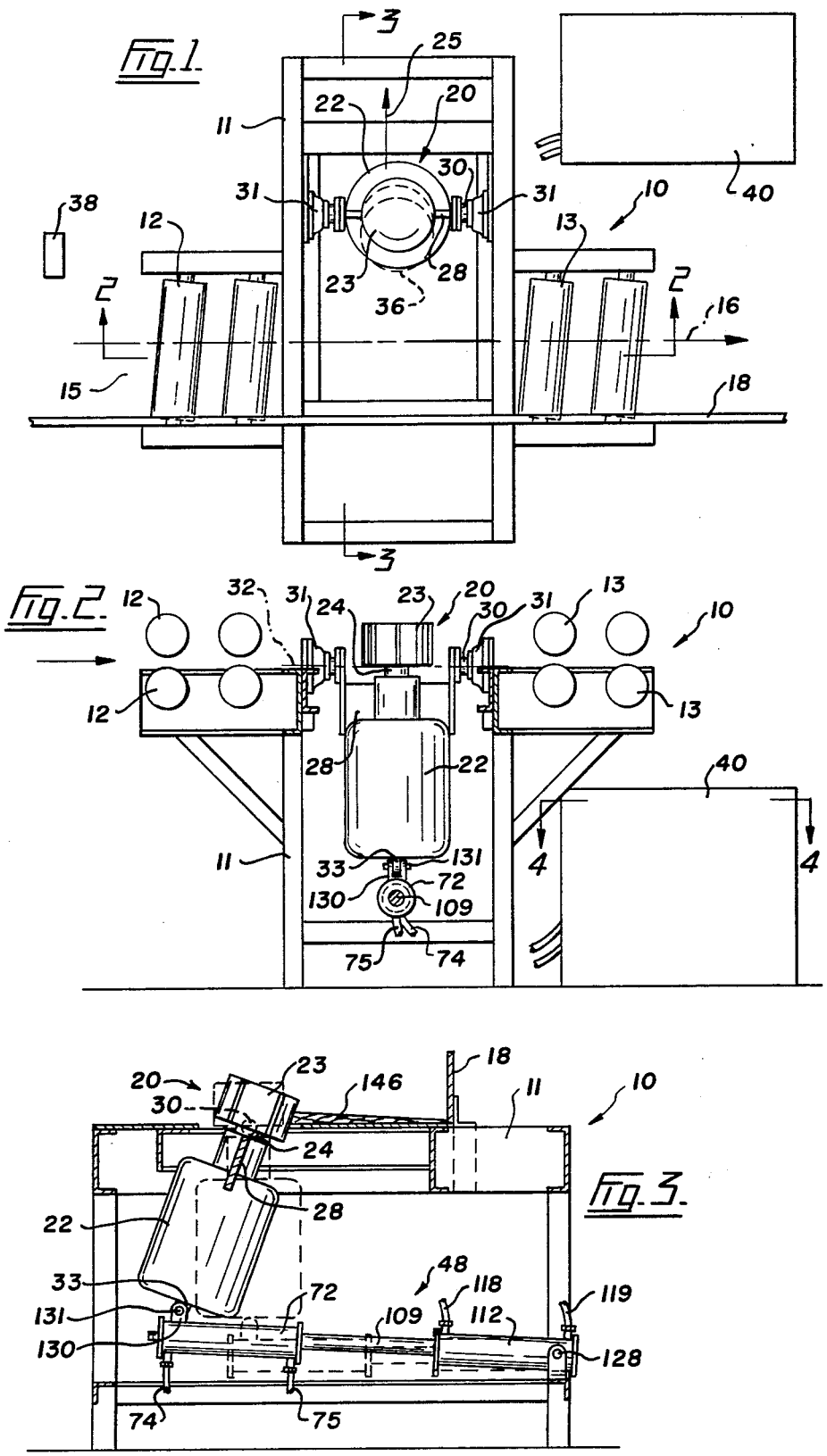

AUTOMATIC CONTROL APPARATUS FOR WANEY EDGE FORMING MACHINES

This invention relates to automatic control apparatus for wood working machines to form waney or wavey edges on boards passing therethrough.

There are machines in the prior art for forming waney or wavey edges on boards. Typical machines of the prior art are illustrated in U.S. Pat. No. 2,851,070, dated Sept. 9, 1958, and U.S. Pat. No. 3,779,294, dated Dec. 18, 1973. Each of these machines has a cutter head which is manually manipulated by an operator who has to keep his eye on the boards as they move through the machine. The machine of U.S. Pat. No. 2,851,070 includes a lever by means of which the operator causes the cutter head to swing in the direction transversely of the board moving past the head to create an undulating edge. If the operator sees a knot in the edge of the board, he manipulates the cutter so as to clear the knot. Similarly, the operator of the machine appearing in U.S. Pat. No. 3,779,294 shifts a carriage by a lever laterally with respect to the board to cause the cutter head mounted on the carriage to create an undulating edge on the board in accordance with the movement created by the operator. He also can press an electrical switch button to cause the cutter to swing relative to the board edge so as to change the angle of the bevel being cut in said edge. In both cases the operator must be constantly on the alert, and the resulting appearance of the boards depends upon his skill.

This invention eliminates the necessity of having an operator to work the cutter head as the boards move through the machine. The machine includes means for automatically swinging the cutter head in the direction transversely of the path along which the boards travel in accordance with a predetermined pattern. A scanner is located along the board path ahead of the cutter, and when this device detects a knot approaching the cutter, the normal automatic operation is overridden and the cutter moves to cut around the knot or to leave the knot untouched. As soon as the knot clears the cutter, the normal automatic operation continues. Thus, the necessity of an operator in constant attendance is eliminated.

The apparatus of this invention automatically controls the cutter unit of a wood edging machine to produce waney edges on boards moving along a feed path and leaving knots at said edges substantially uncut. This apparatus comprises a main control unit including means connected to a cutter unit of a wood edging machine and normally operable to cause swinging movement of said cutter unit in accordance with a predetermined pattern, said movement enabling the cutter unit to cut into the edges of boards moving along a path in the edging machine past said unit, an overriding control unit including means connected to the main control unit means operable to cause said main control unit means to move the cutter unit in the direction away from boards moving along the path without interfering with the normal operation of the main control unit means, and scanning means operatively connected to said overriding control unit means for detecting knots in the edges of boards moving along said path to cause the overriding control unit means to operate and move the cutter unit respectively to avoid said knots.

More specifically the apparatus comprises first and second hydraulic cylinders hydraulically interconnected, said first and second hydraulic cylinders having first and second pistons respectively therein for movement longitudinally thereof, means for connecting the second hydraulic cylinder to a cutter unit of a wood edging machine to cause movement of said unit, said movement enabling the cutter unit to cut into the edges of boards moving along a path in the edging machine past said unit, main control means connected to the first piston operable to reciprocate said piston in the first cylinder in a predetermined pattern, movement of said piston causing corresponding relative movement through said hydraulic interconnection between the second piston and the second hydraulic cylinder, pneumatic control means connected to said second operable to cause movement of the second cylinder and thereby movement of the cutter unit unaffected by the first piston, and scanning means operatively connected to said pneumatic control means for detecting knots in the edges of the boards moving along said path to cause movement of the cutter unit to avoid said knots.

In more detail, the present apparatus comprises first and second hydraulic cylinders hydraulically interconnected, said first and second hydraulic cylinders having first and second pistons repectively therein for movement longitudinally thereof, anchoring means connected to said second piston normally preventing movement thereof, means for connecting the second hydraulic cylinder to a cutter unit of a wood edging machine to cause movement of said unit, said movement enabling the cutter unit to cut into the edges of boards moving along a path in the edging machine past said unit, main control means connected to the first piston operable to reciprocate said piston in the first cylinder in a predetermined pattern, movement of said first piston causing corresponding relative movement through said hydraulic interconnection between the second piston and the second cylinder, said hydraulic interconnection being such as to permit relative movement between the second piston and the second hydraulic cylinder only when the first piston moves in the first cylinder, pneumatic control means connected to said anchoring means to cause movement thereof and thereby movement of the second hydraulic cylinder and the cutter unit connected thereto unaffected by the first piston, and scanning means operatively connected to said pneumatic control means for detecting knots in the edges of the boards moving along said path to cause movement of the anchoring means and consequently the cutter unit to avoid said knots.

Figure 5:
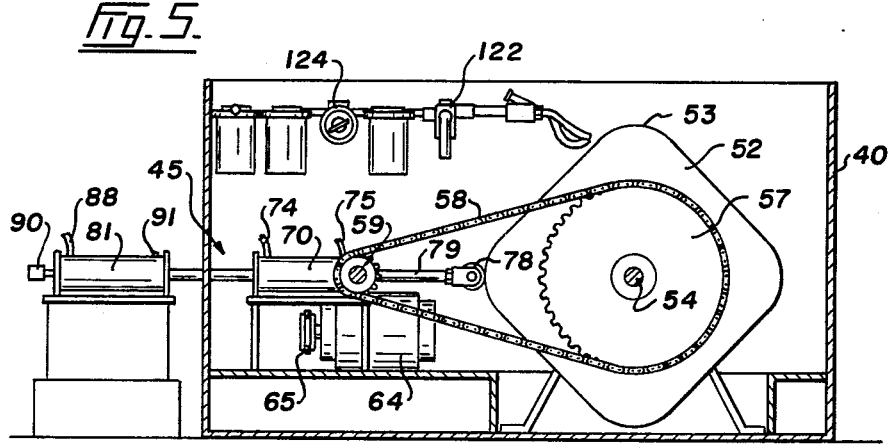
Figure 6:
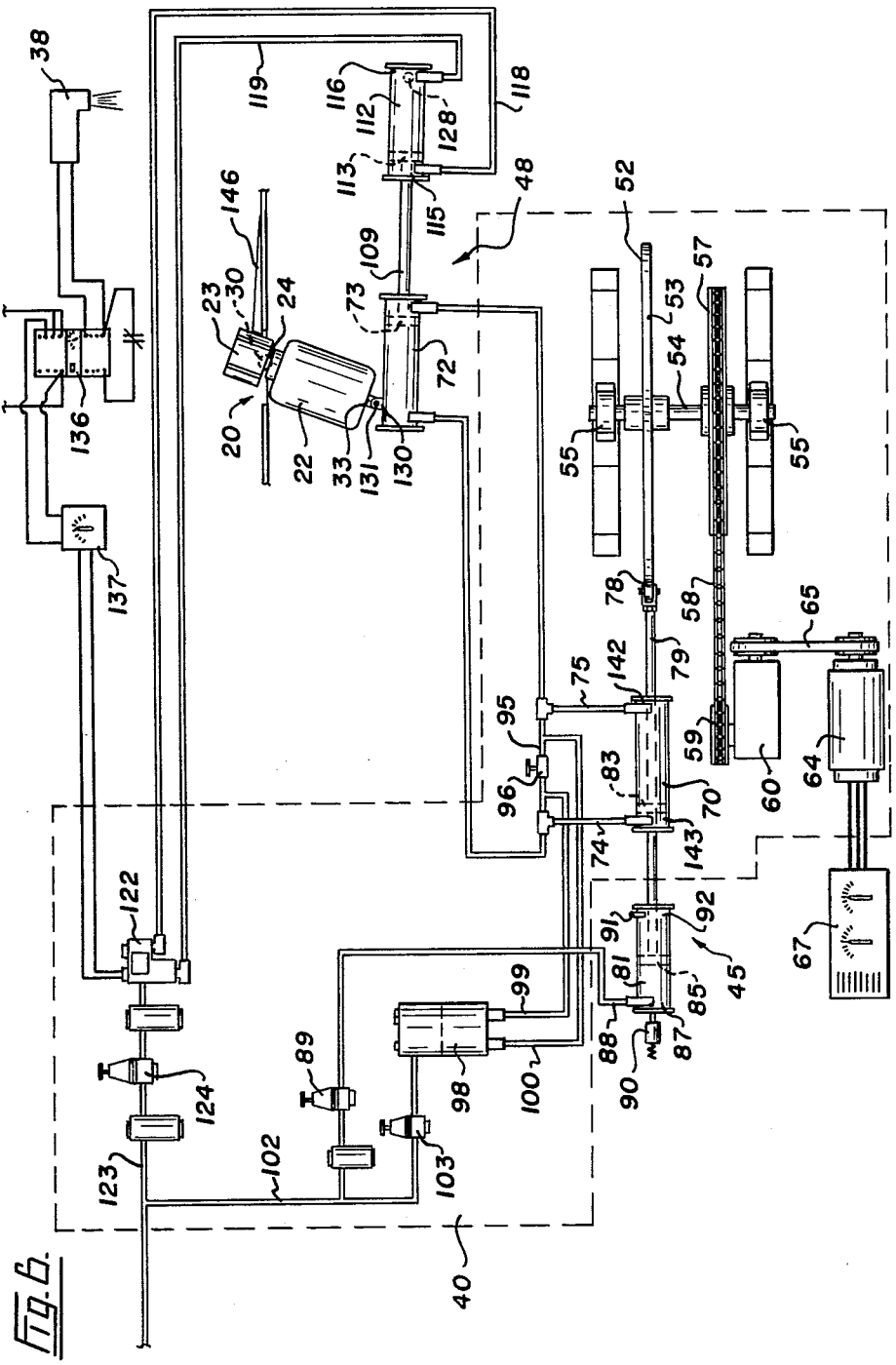

A preferred form of automatic control apparatus is illustrated by way of example in the accompanying drawings, in which:

FIG. 1 is a plan view of a wood edging machine incorporating the present invention, FIG. 2 is a section taken on the line 2—2 of FIG. 1, FIG. 3 is a sectional view taken on the line 3—3 of FIG. 1, FIG. 4 is an enlarged horizontal section taken on the line 4—4 of FIG. 2, and showing the control apparatus in plan, FIG. 5 is a section taken on the line 5—5 of FIG. 4, and FIG. 6 is a flat layout of the control apparatus of this invention.

Referring to the drawings, 10 is a wood edging machine having a supporting frame 11, upper and lower infeed rolls 12 and upper and lower outfeed rolls 13 for moving boards along a path which is indicated by line 16. A fence 18 extends along one side of the path.

A cutter unit 20 is mounted on frame 11 on the opposite side of path 15 from fence 18. This cutter unit includes an electric motor 22 having a standard cutter head 23 mounted on its shaft 24. Motor 20 is retained with its shaft 24 in a substantially vertical position by hangers 28 secured to the motor and projecting upwardly therefrom, these hangers being supported by shaft 30 journalled in bearings 31 carried by frame 11. It will be noted from FIG. 2 that the center line 32 of shaft 30 and bearings 31 extends just below the lower edge of cutter 23. A lug 33 is secured to and projects downwardly from the lower end of motor 22. This is a preferred way of mounting motor 22, but it may be mounted in other ways, the main thing being that the motor must be able to move so that so that cutter head 23 can move back and forth in the direction extending transversely of the path.

By referring to FIG. 1 it will be seen that cutter 23 is located beside path 15 and spaced from fence 18. when the lower end of motor 22 is moved in the direction away from path 15, indicated by arrow 25 in FIG. 1, cutter 23 is tipped into path 15, the extreme inner position of the cutter being indicated by broken line 36.

With the arrangement described so far, boards are moved along path 15 and are gripped by upper and lower infeed rolls 12 and upper and lower outfeed rolls 13, both of which are power driven by means not shown, and the boards are moved with one edge thereof engaging fence 18. The opposite edge of each board is engaged by cutter 23 to form a waney edge on the board as the motor 22 is swung back and forth on bearings 31. The cutter not only moves into the boards as it is moved into the direction transversely of the path, but it tips at the same time to form a waney or bevel edge along the board, the angle of the bevel constantly changing.

A suitable scanner or detector 38 is mounted along path 15 ahead of the cutter unit with respect to the direction of movement of the board. This scanner is aimed towards the edges of the boards that are to be engaged by the cutter head as the boards move along the path. The scanner is such that if it sees a knot in the board edge, it sends a signal which results in the cutter unit being operated to swing cutter 23 outwardly so as to miss or cut around the detected knot. As scanners of this type are well known, it is not necessary to describe them herein.

A control unit is provided for causing cutter unit 20 to swing back and forth in a predetermined pattern and another control unit is provided to override this operation when a knot is detected in a board approaching the cutter unit. These controls are mainly disposed in a container 40 or on rear frame 11.

Referring to FIGS. 4, 5 and 6, 45 is a main control unit for causing reciprocation of the cutter head, and 48 is an overriding control unit for moving the cutter in the direction away from the board edge passing it regardless of the operation of the main control unit.

The main control unit 45 includes means for causing the cutter unit to be swung back and forth in a predetermined pattern or sequence. In this example, the main control unit includes a cam 52 having an irregularly shaped or contoured cam edge 53. This cam is fixedly mounted on a shaft 54 journalled in suitable bearings 55. The shaft is turned by a large sprocket 57 fixedly mounted thereon which is connected by a chain 58 to a small sprocket 59 of a gear reduction unit 60. The reduction unit is driven by an electric motor 64 through a belt and pulley drive 65. Motor 64 is a DC motor, and the speed thereof is regulated by a transformer variable speed and torque control unit 67.

The main control unit 45 also includes a hydraulic cylinder 70 which is connected in parallel with another hydraulic cylinder 72 having a piston 73 therein. Cylinder 72 is mounted on a suitable support for longitudinal movement. The opposite ends of cylinder 70 are connected by hoses or lines 74 and 75 to the opposite ends of cylinder 72.

A cam follower 78 is mounted on the end of a piston rod 79 which extends longitudinally through cylinder 70 and a pneumatic cylinder 81. A piston 83 is fixedly mounted on rod 79 in cylinder 70 and another piston 85 is fixedly mounted on said rod in cylinder 81. The outer end 87 of cylinder 81 is connected to a source of pressure air by a pipe 88. This air source may be a compressor or a storage tank, not shown. A suitable air pressure, for example, 80 p.s.i., is maintained in the pneumatic cylinder between piston 85 and the cylinder end 87 by a pressure regulator 89 in pipe 88. This pressure biases follower 78 against the cam surface 53 of cam 52. A pressure release valve 90 connected to end 87 of the pneumatic cylinder permits piston 85 to be moved by the cam towards said end. A breather 91 is provided for cylinder 81 between piston 85 and its inner end 92. A bypass line 95 extends between lines 74 and 75, and has a normally closed valve 96 therein. An oil reservoir 98 is connected by lines 99 and 100 to bypass line 95 on opposite sides of valve 96. The top of the reservoir 98 is connected by pipe 102 to the source of pressure air, and a pressure regulator 103 in this line maintains a predetermined air pressure on the oil in the reservoir, for example, 10 p.s.i. This arrangement maintains the hydraulic system including the cylinders 70 and 72 constantly filled with oil. Valve 96 can be opened to enable the pistons 73 and 83 to be adjusted in relation to each other.

Piston 73 in cylinder 72 is fixedly connected to a piston rod 109 which extends out of said cylinder and into a pneumatic cylinder 112 where it is connected to a piston 113 in said pneumatic cylinder. This pneumatic cylinder forms part of overriding control unit 48. The inner and outer ends 115 and 116 of cylinder 112 are connected by lines or pipes 118 and 119, respectively, to a solenoid-operated air valve 122 which, in turn, is connected by a pipe 123 to the source of pressure air. An air regulator 124 in pipe 123 provides a predetermined air pressure for cylinder 112, such as, for example, 40 p.s.i. The outer end 116 of cylinder 112 is mounted by a pivot 128 on a suitable support. A lug 130 secured to cylinder 72 is connected to the lug 33 of the cutter unit motor 22 by a bolt or pin 131 so that longitudinal movement of the cylinder causes the motor to swing back and forth on its trunion bearings 30. This causes cutter head 23 to swing transversely of path 15.

The detector 38 is an electronic scanner which is electrically connected to an impulse control 136 which, in turn, is connected to a delay relay 137. This relay is operatively connected to the solenoid valve 122.

The operation of the automatic control apparatus is quite simple. As boards are moved along path 15 past the cutter head 23 of cutter unit 20, cam 52 is rotated by motor 64. The air pressure in the outer end of pneumatic cylinder 81 against its piston 85 maintains follower 78 against the cam surface 53. When the follower is at the low point on the cam edge, piston 83 of hydraulic cylinder 70 is near the end 142 of the cylinder, and when the follower is on the high point of the cam edge, piston 83 is near the opposite end 143 of said cylinder. As the cam moves follower 78 and rod 79 outwardly, piston 85 in cylinder 81 is moved against the pressure air therein, the pressure of which is relieved by valve 90. As piston 83 moves towards end 143 of cylinder 70, hydraulic fluid is forced into cylinder 72. As piston 73 is held against movement by the pressure of the air in pneumatic cylinder 112 against its piston 113, cylinder 72 has to move, swinging the cutter 23 transversely into a board 146, see FIG. 6, moving along the path 15. The setting illustrated in FIG. 6 shows the cutter head in one extreme position. As the cam permits piston 83 to move towards the end 142 of cylinder 70, fluid is directed into the opposite end of cylinder 72 to cause said cylinder to move in the opposite direction and thereby swing the cutter head in the direction away from the board. Thus, normally during the rotation of cam 52 the cutter head 23 is swung back and forth to varying degrees depending upon the contour of the cam edge 53. This causes cutter head 23 to form a wavey bevelled edge on the boards moving past the head in accordance with a predetermined pattern, said pattern depending upon the shape of cam edge 53. As the cutter head tips back and forth, the angle of bevel on the boards changes.

When scanner 38 detects a knot in the edge of a board approaching cutter unit, a signal is generated and transmitted to the delay relay that allows sufficient time for the knot to reach the cutter head, at which time valve 122 is operated to direct pressure air into cylinder 112 between piston 113 and its inner end 115. This moves piston 113 away from end, drawing piston 73 and consequently hydraulic cylinder 72 in the same direction. This swings the cutter head 23 in the direction away from the board. This movement may be sufficient to clear the cutter head of the board or only sufficient to permit the cutter head to make a shallow cut in the edge. In other words, the cutter head is shifted to clear the detected knot or to cut only a small amount of it away. This overrides the effect of main control unit 45 on the cutter head, although said main control unit continues to function. As the knot clears the cutter head, air is directed through line 119 into the outer end of pneumatic cylinder 112 to shift piston 113 back to its normal position where it resists movement of piston 73 in hydraulic cylinder 72.

When this control of apparatus is in operation, the cutter unit automatically forms an irregular waney edge on the boards moving along path 15 and past the cutter head. The cutter head cuts into the boards to varying degrees and at the same time tips back and forth relative to the board edges thereby forming bevels of varying angles. The sequence or pattern can readily be changed merely by replacing cam 52 with one have an edge 53 of different design. The apparatus detects knots in the board edges and causes the cutter unit to cut around these knots in order to enhance the appearance of the boards. This knot-clearing action takes place without interferring with the operation of the normal control means of the cutter unit.

We claim:

1. Apparatus for automatically controlling the cutter unit of a wood edging machine to produce waney edges on boards moving along a feed path and leaving knots at said edges substantially uncut, comprising a main control unit including means connected to a cutter unit of a wood edging machine and normally operable to cause swinging movement of said cutter unit in accordance with a predetermined pattern, said movement enabling the cutter unit to cut into the edges of boards moving along a path in the edging machine past said unit, an overriding control unit including means connected to the main control unit means operable to cause said main control unit means to move the cutter unit in the direction away from boards moving along the path without interfering with the normal operation of the control unit means, and scanning means operatively connected to said overriding control unit means for detecting knots in the edges of boards moving along said path to cause the overriding control unit means to operate and move the cutter unit respectively to avoid said knots.

2. Control apparatus as claimed in claim 1 in which said main control means comprises a fluid cylinder mounted for longitudinal movement and connected to the cutter unit, a piston in said cylinder, and means operatively connected to the cylinder to cause relative movement between the cylinder and the piston thereof to move the cutter unit in accordance with said pattern, and said overriding control unit means comprises means connected to said piston to cause movement of the piston and cylinder in response to the scanning means.

3. Control apparatus as claimed in claim 2 in which said means operatively connected to the cylinder comprises another fluid cylinder, line means interconnecting the opposite ends of said cylinders to each other, a piston in said other cylinder, and means connected to the latter piston to reciprocate said latter piston in its cylinder in accordance with said pattern to cause the relative movement between the first-mentioned cylinder and the piston therein.

4. Control apparatus as claimed in claim 2 in which said means of the overriding control unit comprises a fluid cylinder, a piston in said cylinder, means rigidly connecting said piston to the piston of the cylinder of the main control unit means, and fluid pressure means normally maintaining the piston in said overriding control unit in one position, and operable by the scanning means to move the latter piston along its cylinder out of said one position.

5. Apparatus for automatically controlling the cutter of a wood edging machine to produce waney edges on boards moving along a feed path and leaving knots at said edges substantially uncut, comprising first and second hydraulic cylinders hydraulically interconnected, said first and second hydraulic cylinders having first and second pistons respectively thereon for movement longitudinally thereof, means for connecting the second hydraulic cylinder to a cutter unit of a wood edging machine to cause movement of said unit, said movement enabling the cutter unit to cut into the edges of boards moving along a path in the edging machine past said unit, main control means connected to the first piston operable to reciprocate said piston in the first cylinder in a predetermined pattern, movement of said first piston causing corresponding relative movement through said hydraulic interconnection between the second piston and the second hydraulic cylinder, pneumatic control means connected to said second piston operable to cause movement of the second cylinder and thereby movement of the cutter unit unaffected by the first piston, and scanning means operatively connected to said pneumatic control means for detecting knots in the edges of the boards moving along said path to cause movement of the cutter unit respectively to avoid said knots.

6. Control apparatus as claimed in claim 5 wherein said first hydraulic cylinder and said second hydraulic cylinder are interconnected in parallel by fluid lines connected respectively to opposite ends thereof.

7. Control apparatus as claimed in claim 5 in which said main control means comprises a rotatably mounted cam having a contoured cam surface, and a cam follower connected to the first piston of the first hydraulic cylinder and bearing against said cam surface to be moved thereby.

8. Control apparatus as claimed in claim 5 in which said main control means comprises a rotatably mounted cam having a contoured cam surface, a cam follower connected to the first piston of the first hydraulic cylinder and bearing against said cam surface to be moved thereby, and pneumatic means connected to the first piston to maintain the cam follower against the cam surface.

9. Control apparatus as claimed in claim 8 in which said pneumatic means comprises a pneumatic cylinder, a piston slidable in said pneumatic cylinder, means rigidly connecting the latter piston to the first piston of the first hydraulic cylinder, pneumatic means maintaining pressure in the penumatic cylinder against the piston thereof and thereby against said first piston, and a pressure relief valve connected to said pneumatic cylinder to relieve the pressure thereof when the piston of the latter cylinder is moved by said first piston to permit movement of said first piston.

10. Control apparatus as claimed in claim 5 in which said pneumatic control means comprises a pneumatic cylinder having a piston therein for movement longitudinally thereof, means connecting said pneumatic cylinder piston to the second piston of the second hydraulic cylinder for movement in unison, and means normally maintaining sufficient pneumatic pressure in said pneumatic cylinder to prevent movement of the piston therein, and means for selectively pressurizing the pneumatic cylinder to cause movement of the piston therein to move said second hydraulic cylinder and thereby the cutter unit through said second piston.

11. Apparatus for automatically controlling the cutter unit of a wood edging machine to produce waney edges on boards moving along a feed path and leaving knots at said edges substantially uncut, comprising first and second hydraulic cylinders hydraulically interconnected, said first and second hydraulic cylinders having first and second pistons respectively therein for movement longitudinally thereof, anchoring means connected to said second piston normally preventing movement thereof, means for connecting the second hydraulic cylinder to a cutter unit of a wood edging to cause movement of said unit, said movement enabling the cutter unit to cut into the edges of boards moving along a path in the edging machine past said unit, main control means connected to the first piston operable to reciprocate said piston in the first cylinder in a predetermined sequence, movement of said first piston causing relative movement through said hydraulic interconnection between the second piston and the second cylinder, said hydraulic interconnection being such as to permit relative movement between the second piston and the second hydraulic cylinder only when the first piston moves in the first cylinder, pneumatic control means connected to said anchoring means to cause movement thereof and thereby movement of the second hydraulic cylinder and the cutter unit connected thereto unaffected by the first piston, and scanning means operatively connected to said pneumatic control means for detecting knots in the edges of the boards moving along said path to cause movement of the anchoring means and consequently the cutter unit to avoid respectively said knots.

12. Control apparatus as claimed in claim 11 wherein said first hydraulic cylinder and said second hydraulic cylinder are interconnected in parallel by fluid lines connected respectively to opposite ends thereof.

13. Control apparatus as claimed in claim 11 in which said main control means comprises a rotatably mounted cam having a contoured cam surface, and a cam follower connected to the first piston of the first hydraulic cylinder and bearing against said cam surface to be moved thereby.

14. Control apparatus as claimed in claim 11 in which said main control means comprises a rotatably mounted cam having a contoured cam surface, a cam follower connected to the first piston of the first hydraulic cylinder and bearing against said cam surface to be moved thereby, and pneumatic means connected to the first piston to maintain the cam follower against the cam surface.

15. Control apparatus as claimed in claim 11 in which said anchoring means comprises a pneumatic cylinder having a piston therein for movement longitudinally thereof, means connecting said pneumatic cylinder piston to the second piston of the second hydraulic for movement in unison, and means normally maintaining sufficient pneumatic pressure in said pneumatic cylinder to prevent movement of the piston therein, and means for selectively pressurizing the pneumatic cylinder to cause movement of the piston therein to move said second hydraulic cylinder and thereby the cutter unit through said second piston.

16. Control apparatus as claimed in claim 14, in which said pneumatic means comprises a pneumatic cylinder, a piston slidable in said pneumatic cylinder, means rigidly connecting the latter piston to the first piston of the first hydraulic cylinder, pneumatic means maintaining pressure in the pneumatic cylinder against the piston thereof and thereby against said first piston, and a pressure relief valve connected to said pneumatic cylinder to relieve the pressure thereof when the piston of the latter cylinder is moved by said first piston to permit movement of said first piston.

17. Apparatus for automatically controlling the cutter unit of a wood edging machine to produce waney edges on boards moving along a feed path and leaving knots at said edges substantially uncut, comprising first and second hydraulic cylinders hydraulically interconnected in parallel by fluid lines connected to the opposite ends thereof, said first and second hydraulic cylinder having first and second pistons respectively therein for movement longitudinally thereof, means for connecting the second hydraulic cylinder to a cutter unit of a wood edging machine to cause movement of said unit, said movement enabling the cutter unit to cut into the edges of boards moving along a path in the edging machine past said unit, a rotatably mounted cam having a contoured cam surface, a cam follower against said surface and connected to the first piston, a first pneumatic cylinder having a piston thereon for movement longitudinally thereof, means rigidly connecting the first pneumatic cylinder piston to the first hydraulic cylinder piston, pneumatic means maintaining pressure in the pneumatic cylinder against the piston thereof and thereby against said first hydraulic cylinder piston while permitting movement of the first pneumatic cylinder piston by said first hydraulic cylinder piston, a second pneumatic cylinder having a piston therein for movement longitudinally thereof, means rigidly connecting the second pneumatic cylinder piston to said second piston of the second hydraulic cylinder, said hydraulic interconnection being such as to prevent relative movement between the second hydraulic cylinder and the second piston thereof only when the first hydraulic cylinder piston moves in the first hydraulic cylinder, pneumatic control means movably maintaining pressure in the second pneumatic cylinder to prevent movement of the piston therein thereby normally anchoring said second hydraulic cylinder piston, said pneumatic control means being selectively operable to release said normal pressure and to supply pressure to move the piston in the second pneumatic cylinder thereby moving the second hydraulic cylinder and the cutter unit connected thereto, and scanning means operatively connected to said pneumatic control means for detecting knots in the edges of the boards moving along said path to operate the pneumatic control means to cause movement of the cutter unit to avoid respectively said knots.

18. Control apparatus as claimed in claim 17 in which said pneumatic control means comprises a source of pressure air connected to opposite ends of said second pneumatic cylinder, and valve means for selectively directing pressure air to either end of the second pneumatic cylinder, said valve means normally directing pressure air to one end of the second pneumatic cylinder to prevent movement of the piston therein and being operable to direct said pressure air to the opposite end of said second pneumatic cylinder to move the piston therein, and said valve means being operated by said scanning means.

* * * * *